(12) United States Patent
Thubert et al.

(10) Patent No.: US 11,542,889 B2
(45) Date of Patent: Jan. 3, 2023

(54) DUCTED FAN TURBINE ENGINE COMPRISING A SYSTEM INVOLVING SCREENS FOR BLOCKING OFF THE DUCT FOR THE SECONDARY FLOW

(71) Applicant: Airbus Operations SAS, Toulouse (FR)

(72) Inventors: Benjamin Thubert, Toulouse (FR); Kevin Windhols, Toulouse (FR)

(73) Assignee: AIRBUS OPERATIONS SAS, Toulouse (FR)

(*) Notice: Subject to any disclaimer, the term of this patent is extended or adjusted under 35 U.S.C. 154(b) by 0 days.

(21) Appl. No.: 17/379,746

(22) Filed: Jul. 19, 2021

(65) Prior Publication Data
US 2022/0025832 A1 Jan. 27, 2022

(30) Foreign Application Priority Data
Jul. 21, 2020 (FR) ...................................... 2007644

(51) Int. Cl.
*F02K 1/76* (2006.01)
*F02K 1/72* (2006.01)

(52) U.S. Cl.
CPC ................ *F02K 1/763* (2013.01); *F02K 1/72* (2013.01); *F05D 2220/323* (2013.01); *F05D 2260/54* (2013.01); *F05D 2260/57* (2013.01); *F05D 2260/605* (2013.01)

(58) Field of Classification Search
CPC ... F02K 1/763; F02K 1/70; F02K 1/72; F05D 2260/54; F05D 2260/57; F05D 2260/605; F05D 2220/323
See application file for complete search history.

(56) References Cited

U.S. PATENT DOCUMENTS

| | | | |
|---|---|---|---|
| 3,330,115 A | 7/1967 | Markowski | |
| 3,366,349 A | 1/1968 | Rudis | |
| 2020/0018258 A1* | 1/2020 | Aziz | F02K 1/605 |
| 2020/0347800 A1 | 11/2020 | Gonidec et al. | |
| 2021/0207556 A1* | 7/2021 | Czapla | F02K 1/763 |

FOREIGN PATENT DOCUMENTS

| | | |
|---|---|---|
| FR | 3076864 A1 | 7/2019 |
| FR | 3087848 A1 | 5/2020 |

OTHER PUBLICATIONS

French Search Report; priority document.

* cited by examiner

*Primary Examiner* — Andrew H Nguyen
(74) *Attorney, Agent, or Firm* — Greer, Burns & Crain, Ltd.

(57) ABSTRACT

A ducted fan turbine engine with a nacelle and a duct for a secondary flow. The nacelle comprises a fixed structure. A mobile cowl is able to move between a forward position and a backward position to define an opening between the duct and the outside. A plurality of rollers are mounted to freely rotate on the mobile cowl. For each roller there is a flexible screen with a first edge fixed to the roller and a second edge, in which the screen is able to adopt a furled position, wound around the roller, or a deployed position deployed across the duct. A deployment mechanism is arranged to move each second edge to move the screen from the furled position to the deployed position. A furling mechanism is arranged to drive each roller in rotation to move the associated screen from the deployed position to the furled position.

9 Claims, 4 Drawing Sheets

DUCTED FAN TURBINE ENGINE COMPRISING A SYSTEM INVOLVING SCREENS FOR BLOCKING OFF THE DUCT FOR THE SECONDARY FLOW

CROSS-REFERENCES TO RELATED APPLICATIONS

This application claims the benefit of the French patent application No. 2007644 filed on Jul. 21, 2020, the entire disclosures of which are incorporated herein by way of reference.

FIELD OF THE INVENTION

The present invention relates to a ducted fan turbine engine which comprises flexible screens and a deployment mechanism which deploys the screens in order to block off the duct for the secondary flow and a furling mechanism which furls the screens to remove the obstruction in the secondary flow duct, and to an aircraft comprising at least one such ducted fan turbine engine.

BACKGROUND OF THE INVENTION

An aircraft comprises a fuselage, to each side of which is fixed a wing. Suspended beneath each wing is at least one ducted fan turbine engine. Each ducted fan turbine engine is fixed beneath the wing via a pylon which is fixed between the structure of the wing and the structure of the ducted fan turbine engine.

The ducted fan turbine engine comprises an engine and a nacelle which is fixed around the engine. The ducted fan turbine engine has, between the nacelle and the engine, a secondary duct in which a secondary flow circulates.

The nacelle comprises a plurality of reverser doors, each able to rotate on the structure of the nacelle between a non-obstructing position in which it is outside of the secondary duct and a deployed position in which it is positioned across the secondary duct so as to deflect the secondary flow towards an opening in the wall of the nacelle and which is open between the secondary duct and the outside of the nacelle.

Thus, the secondary flow is deflected to the outside and more specifically towards the front of the turbine engine in order to produce a reverse thrust.

Although reverser doors are entirely satisfactory, it is desirable to find different mechanisms, particularly mechanisms that are not as heavy.

SUMMARY OF THE INVENTION

It is an object of the present invention to propose a ducted fan turbine engine which comprises flexible screens and a deployment mechanism which deploys the screens so that they block off the secondary flow duct and a furling mechanism which furls the screens to remove the obstruction from the secondary flow duct.

To this end, the invention proposes a ducted fan turbine engine having a longitudinal direction and comprising an engine and a nacelle surrounding the engine which comprises a fan casing in which a duct for a secondary flow is delimited between the nacelle and the engine and wherein an air flow circulates from the front towards the rear of the ducted fan turbine engine, the nacelle comprising:

a fixed structure fixed to the fan casing,
a mobile cowl capable of translational movement on the fixed structure in a direction of translation between a forward position in which the mobile cowl is positioned in such a way that it is close up to the fan casing and a backward position in which the mobile cowl is positioned in such a way that it is distant from the fan casing in order to define between these an opening between the duct and the outside of the nacelle,
a set of actuators causing the mobile cowl to move between the forward position and the backward position, and vice versa,
a plurality of rollers, each mounted with the freedom to rotate on the mobile cowl to the rear of the opening when the mobile cowl is in the backward position,
for each roller, a flexible screen having a first edge fixed to the roller and a second edge opposite to the first edge, in which the screen can alternately adopt a furled position in which the screen is wound up around the roller or a deployed position in which the screen is unwound from the roller and stretched between the roller and the engine across the duct,
a deployment mechanism arranged to move the second edge of each screen so as to move the screen from the furled position to the deployed position, and
a furling mechanism arranged to drive each roller in rotation so as to move the screen associated with the roller from the deployed position to the furled position.

Replacing the reverser doors and their drive mechanisms with flexible screens allows a reduction in mass.

Advantageously, the deployment mechanism comprises:
for each second edge, a plate firmly secured to the second edge,
for each plate, at least one hauling pulley mounted with the freedom to rotate on the plate,
a cable which passes over each hauling pulley, and
for each end of the cable, a disengageable movement system which hauls on the end.

Advantageously, there is a hauling pulley at each end of each plate.

Advantageously, each deployment system comprises a set of guide pulleys and an electric roller onto which the cable is wound.

According to one particular embodiment, the furling mechanism comprises, for each roller, a diverting pulley fixed coaxially to the roller, a winding pulley fixed to the fixed structure, a winding cable, of which one end is fixed to the fixed structure, and of which the other end is fixed to the winding pulley, and in which the winding cable passes over the diverting pulley, a nitrogen damper, of which a cylinder is fixed to the fixed structure, and of which a piston is able to slide in the cylinder, and a conversion system which converts the rotational movement of the winding pulley into a translational movement of the piston and vice versa.

According to one particular embodiment, the furling mechanism comprises, for each roller, a diverting pulley fixed coaxially to the roller, a winding pulley, a winding cable, of which one end is fixed to the fixed structure, and of which the other end is fixed to the winding pulley, and in which the winding cable passes over the diverting pulley, and a disengageable electric winder to which the winding pulley is fixed.

Advantageously, for each screen the ducted fan turbine engine comprises a return element which urges the screen into the furled position.

Advantageously, each return element is a helical spring, of which one end is fixed at the second edge of the screen concerned and a second end is fixed at an element that is fixed with respect to the roller associated with the screen concerned.

The invention also proposes an aircraft comprising at least one ducted fan turbine engine according to one of the preceding variants.

BRIEF DESCRIPTION OF THE DRAWINGS

The abovementioned features of the invention, together with others, will become more clearly apparent from reading the following description of one exemplary embodiment, the description being given in conjunction with the attached drawings, among which.

DETAILED DESCRIPTION OF THE PREFERRED EMBODIMENTS

Figure 1:
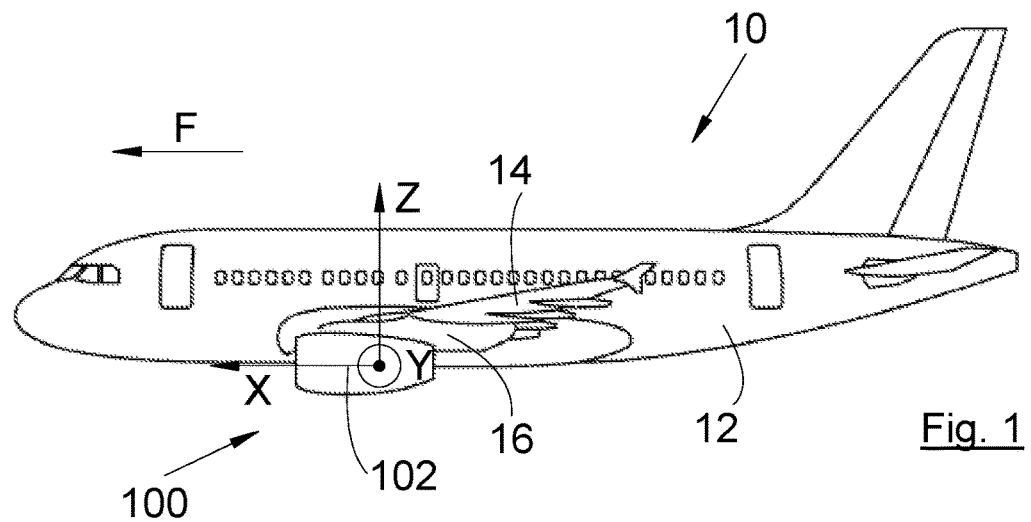
FIG. 1 is a side view of an aircraft comprising a ducted fan turbine engine according to the invention.

In the description which follows, the terms relating to a position are considered with reference to the direction of forward travel of an aircraft as depicted in FIG. 1 by the arrow F.

FIG. 1 shows an aircraft 10 which comprises a fuselage 12, on each side of which is a fixed a wing 14 which bears at least one ducted fan turbine engine 100 according to the invention. The ducted fan turbine engine 100 is fixed beneath the wing 14 by means of a pylon 16.

Figure 3:
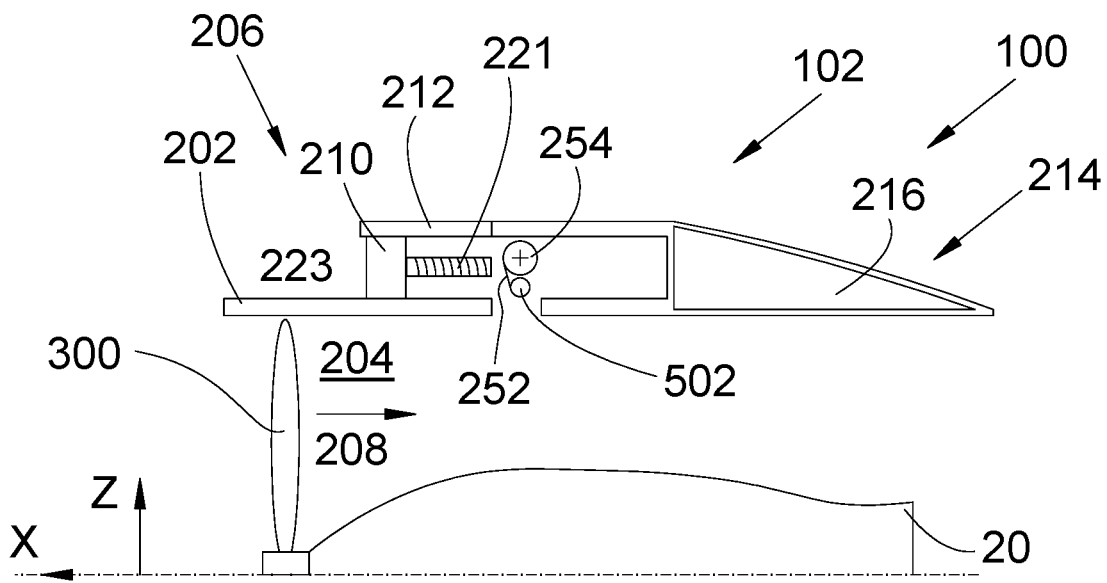
FIG. 3 is a schematic depiction of a ducted fan turbine engine according to the invention, viewed in section on a vertical plane and in the forward and furled position.
Figure 4:
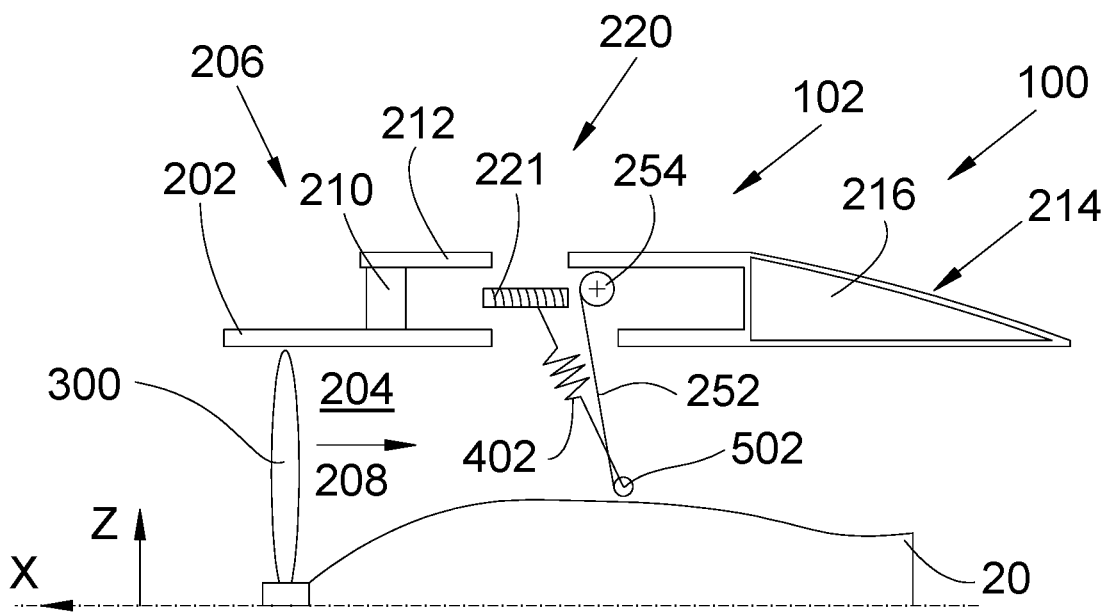
FIG. 4 is a schematic depiction of a ducted fan turbine engine according to the invention, viewed in section on a vertical plane and in the backward and deployed position.

FIG. 3 and FIG. 4 show the ducted fan turbine engine 100 which has a nacelle 102 and an engine 20 which is housed inside the nacelle 102. The ducted fan turbine engine 100 also comprises a fan casing 202.

In the description which follows, and by convention, the longitudinal direction of the ducted fan turbine engine 100 which is parallel to the longitudinal axis of the aircraft 10 oriented positively towards the front of the aircraft 10 is referred to as X, the transverse direction which is horizontal when the aircraft is on the ground is referred to as Y, and the vertical direction is referred to as Z, these three directions X, Y and Z being mutually orthogonal.

The ducted fan turbine engine 100 has, between the nacelle 102 and the engine 20, a duct 204 in which a secondary flow 208 coming from the air inlet through a fan 300 circulates and which therefore flows in the direction of flow which extends from the front towards the rear of the ducted fan turbine engine 100.

The nacelle 102 has a fixed structure 206 which is mounted fixedly on the fan casing 202. The fixed structure 206 is made up, in particular here, of a front frame 210 mounted around the fan casing 202 and of exterior panels 212 fixed to the front frame 210 and forming an exterior aerodynamic surface.

The nacelle 102 has a mobile assembly 214 which has a mobile cowl 216 which, in this instance, forms the exterior walls of the jet pipe.

The nacelle 102 also has cascades of vanes 221 which are secured to the mobile assembly 214.

The mobile cowl 216 is mounted with the ability to move in translation in a direction of translation roughly parallel to the longitudinal direction X on the fixed structure 206 of the nacelle 102.

The mobile cowl 216 is able to move between a forward position (FIG. 3) and a backward position (FIG. 4) and vice versa. In the forward position, the mobile cowl 216 is positioned as far forward as possible with respect to the direction of forward travel so that the mobile cowl 216 is close up to the exterior panels 212 and to the fan casing 202 and thus forms a continuous aerodynamic surface. In the backward position, the mobile cowl 216 is positioned as far towards the rear as possible with respect to the direction of forward travel so that the mobile cowl 216 is distant from the exterior panels 212 and from the fan casing 202 so as to define between these an opening 220 which opens between the duct 204 and the outside and in which the cascades of vanes 221 are positioned.

In the forward position, the mobile cowl 216 and the exterior panels 212 are in the continuation of one another so as to define the exterior surface of the nacelle 102, and the mobile cowl 216 and the fan casing 202 are in the continuation of one another so as to define the exterior surface of the duct 204. In the forward position, the cascades of vanes 221 are housed between the exterior panels 212 and the fan casing 202.

In the backward position, the mobile cowl 216 and the fan casing 202, as well as the exterior panels 212, are distant from one another and between them define the opening 220 between the duct 204 and the outside of the nacelle 102. What that means to say is that the air of the secondary flow 208 passes through the opening 220 to reach the outside of the ducted fan turbine engine 100 by passing through the cascades of vanes 221.

The translational movement of the mobile cowl 216 is brought about by any appropriate means, such as, for example, guideway systems between the beams of the fixed structure 206 and the mobile cowl 216.

The nacelle 102 also comprises a set of actuators (not depicted) causing the translational movement of the mobile cowl 216 between the forward position and the backward position and vice versa. Each actuator is controlled by a control unit, for example, a controller of the processor type, which commands movements in one direction or the other according to the needs of the aircraft 10.

Each actuator may, for example, adopt the form of a double-acting ram (with two working directions) of which the cylinder is fixed to the fixed structure 206 and a rod is fixed to the mobile cowl 216.

The fan casing 202 and the exterior panels 212 delimit the opening 220 on the upstream side with respect to the direction of flow, and the mobile cowl 216 delimits the opening 220 on the downstream side with respect to the direction of flow.

Figure 2:
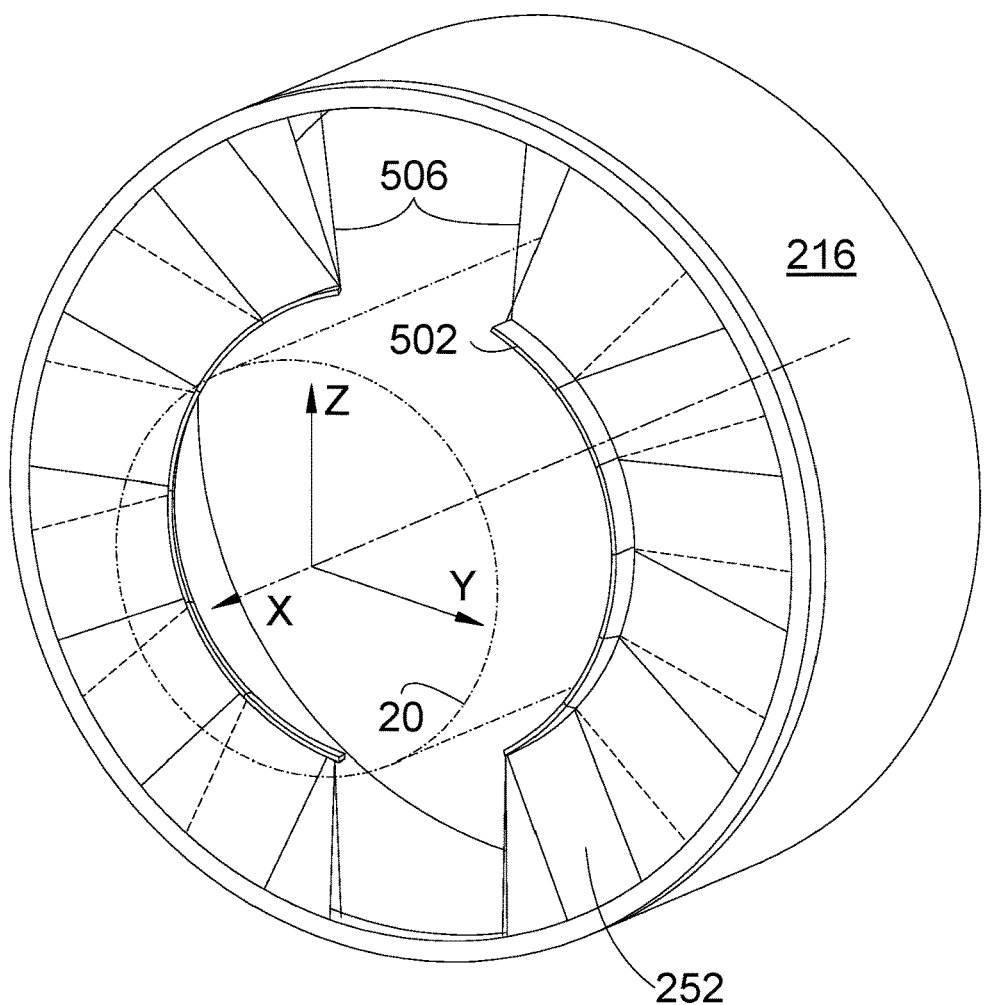
FIG. 2 is a perspective view of the ducted fan turbine engine according to the invention, with the screens in the deployed position.

FIG. 2 shows the mobile cowl 216 and the engine 20 which in this instance is embodied in the form of a cylinder drawn in chain line.

The nacelle 102 comprises a plurality of rollers 254, each mounted with the freedom to rotate on the mobile cowl 216. Each roller 254 is mounted inside the mobile cowl 216, outside of the duct 204 and to the rear of the opening 220 when the mobile cowl 216 is in the backward position. The rollers 254 are angularly distributed about the longitudinal direction X along the perimeter of the mobile cowl 216.

For each roller 254, the nacelle 102 comprises a flexible screen 252 which in this instance adopts a trapezoidal overall shape. Each screen 252 may alternately adopt a furled position (FIG. 3) or a deployed position (FIGS. 2 and 4).

In the furled position, each screen 252 is wound around the associated roller 254. Thus, in the furled position, the screen 252 is wound around the roller 254, and in the deployed position, the screen 252 is unwound from the roller 254 and stretched between the roller 254 and the engine 20 across the duct 204 in order to block off this duct. Each screen 252 has a first edge which is fixed to the roller 254 and a second edge opposite to the first edge and which is distanced away from the roller 254 in the deployed position and brought closer to the roller 254 in the furled position.

In this instance, the axis of rotation of each roller 254 is inscribed in a plane perpendicular to the longitudinal direction X and is perpendicular to the radial direction with respect to the longitudinal direction X and passing through the middle of the roller 254.

The nacelle 102 also comprises a deployment mechanism which is arranged to move the second edge of each screen 252 so as to move the screen 252 from the furled position to the deployed position, and a furling mechanism which is arranged to drive each roller 254 in rotation so as to move the screen 252 associated with the roller 254 from the deployed position to the furled position.

The deployment and furling mechanisms are synchronized with the movement of the mobile cowl 216 so that the transition from the furled position to the deployed position corresponds to the transition from the forward position to the backward position, so that the transition from the deployed position to the furled position corresponds to the transition from the backward position to the forward position.

In the deployed position, the screens 252 are positioned to the rear of the opening 220, forming a barrier in the duct 204 to deflect the secondary flow 208 coming from the front toward the opening 220. In the deployed position, the second edge of each screen 252 sits around the engine 20.

The operation thus comprises, starting from the forward/furled position, commanding activation of the actuators to move the mobile cowl 216 from the forward position to the backward position, which causes the cascades of vanes 221 to move opposite the opening 220.

During this movement, the deployment mechanism deploys each screen 252 across the duct 204.

Conversely, the operation thus comprises, starting from the backward/deployed position, commanding activation of the actuators to move the mobile cowl 216 from the backward position to the forward position, causing the cascades of vanes 221 to move towards their initial position. During this movement, the furling mechanism furls each screen 252 to outside the duct 204.

The use of several flexible screens 252 allows a lightening of the assembly in comparison with the use of reverser doors of the prior art. Furthermore, the screens 252 enable adjustment of the efficiency and the area match which characterize a thrust reverser. The term "area match" here refers to the ratio between the outlet cross section of the jet pipe in direct-jet mode and the outlet cross section of the jet pipe in reverse-thrust mode.

Figure 5:
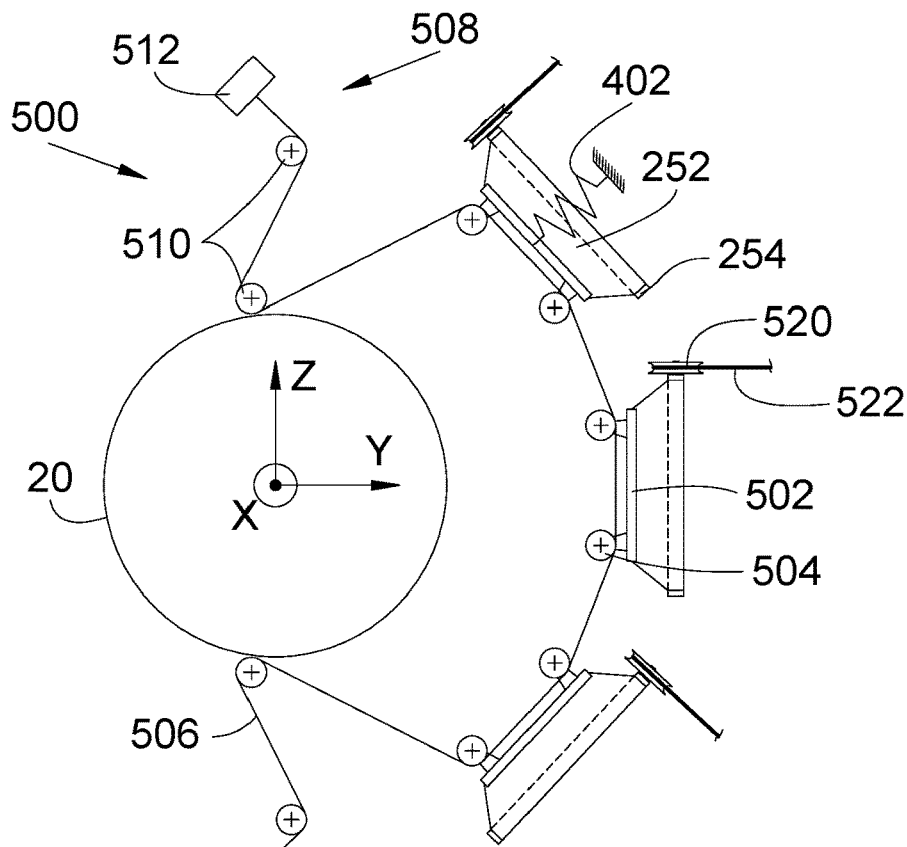
FIG. 5 is a schematic and face-on depiction of a deployment mechanism in the furled position.
Figure 6:
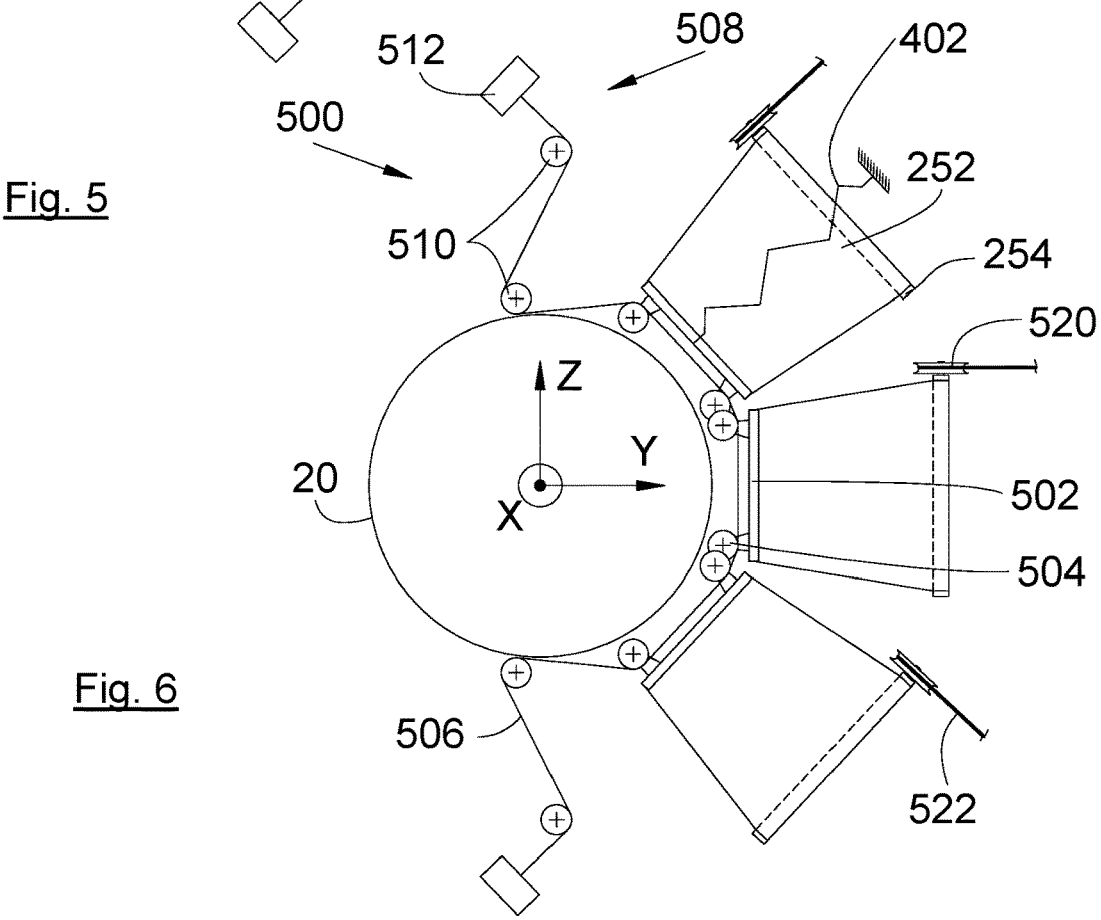
FIG. 6 is a schematic and face-on depiction of the deployment mechanism in the deployed position.

FIGS. 5 and 6 show a deployment mechanism 500 according to one particular embodiment. These FIGS. 5 and 6 depict just three screens 252, for the sake of ease of understanding, but the other screens 252 are arranged angularly around the longitudinal direction X.

For each screen 252, the deployment mechanism 500 comprises a plate 502 firmly secured to the second edge of the screen 252 and which provides the second edge with rigidity.

Each plate 502 carries at least one hauling pulley 504 mounted with the freedom to rotate on the plate 502. Here, for balancing reasons, the plate 502 bears a hauling pulley 504 at each end of the plate 502, namely at each end of the second edge.

For several screens 252, the deployment mechanism 500 also comprises a cable 506 which passes over each hauling pulley 504 of the several screens 252. In the embodiment of the invention that is depicted in FIG. 2, there are two cables 506, one for the screens 252 on the port side and one for the screens 252 of the starboard side. Of course, a different distribution is possible.

For each end of the cable 506, the deployment mechanism 500 comprises a movement system 508 which hauls on the end. Thus, hauling on each end of the cable 506 will tension the cable 506 and deploy each screen 252 through the movement of the associated plate 502 under the effect of the cable 506.

Each movement system 508 here comprises a set of guide pulleys 510 and an electric winder 512 onto which the cable 506 is wound.

The furling mechanism comprises a mechanism which causes each roller 254 to rotate in the direction for winding the screen 252 onto the roller 254.

When the furling mechanism is activated, the deployment mechanism needs to be disengaged so as not to generate any retention force on the screen 252. In the case of FIGS. 5 and 6, each movement system 508, and more particularly each electric winder 512, has to be disengaged so as to turn freely.

Figure 7:
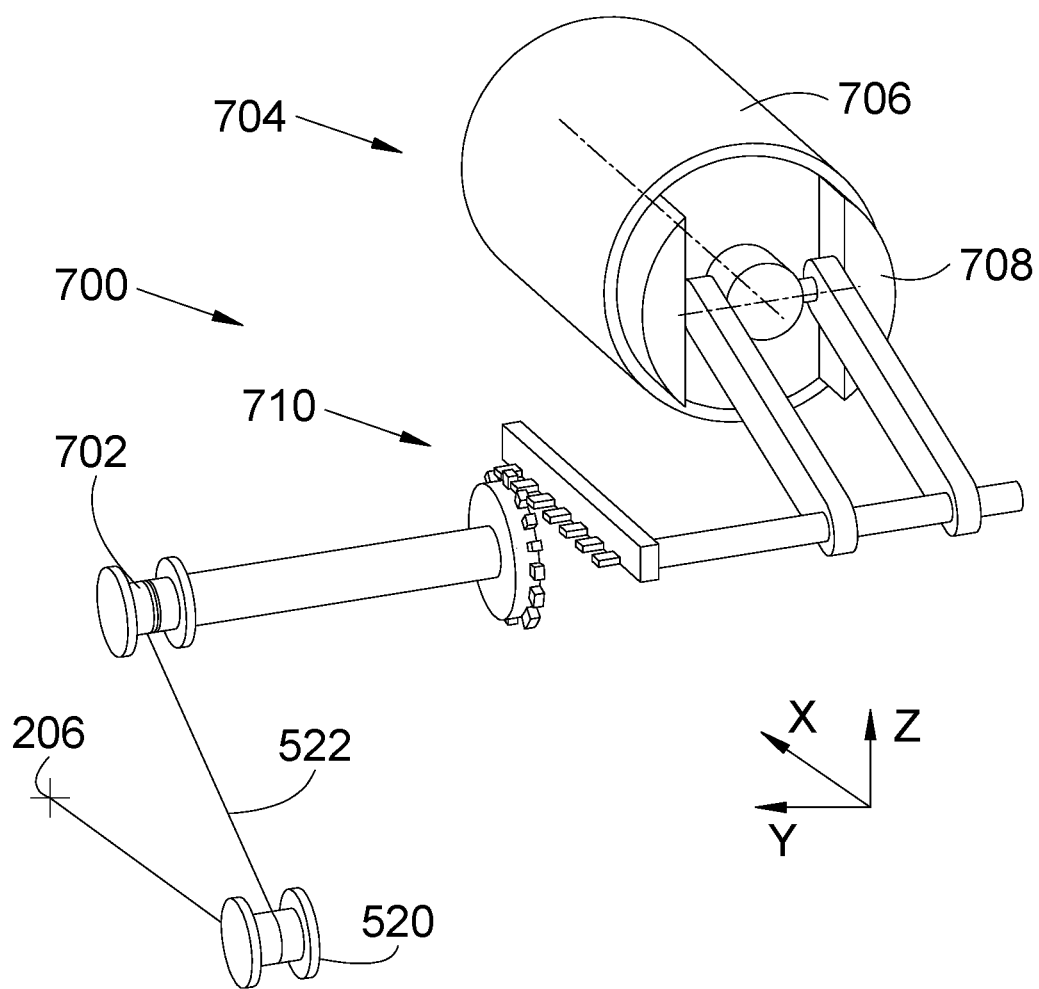
FIG. 7 is a perspective view of a furling mechanism.

FIG. 7 shows a furling mechanism 700 according to one particular embodiment.

For each roller 254, the furling mechanism 700 comprises a diverting pulley 520 fixed coaxially to the roller 254, a winding pulley 702 fixed to the fixed structure 206 and a winding cable 522 of which one end is fixed to the fixed structure 206 and of which the other end is fixed to the winding pulley 702 and in which the winding cable 522 passes over the diverting pulley 520.

For each roller 254, the furling mechanism 700 comprises a nitrogen damper 704 which comprises a cylinder 706 fixed to the fixed structure 206 and a piston 708 sliding in the cylinder 706.

For each roller 254, the furling mechanism 700 also comprises a conversion system 710 which converts the rotational movement of the winding pulley 702 into a translational movement of the piston 708, and vice versa.

The conversion system 710 here takes the form of a rack-pinion system.

Starting from the forward position, the mobile assembly 214 moves back, which has a tendency to move the diverting pulley 520 towards the rear and therefore to unwind the winding cable 522 of the winding pulley 702.

Through the action of the conversion system 710, the rotation of the winding pulley 522 causes the piston 708 to retreat into the cylinder 706, thus compressing the nitrogen present in the nitrogen damper 704.

Conversely, starting from the backward position, when the mobile assembly 214 advances, the winding cable 522 relaxes and the pressure of the nitrogen against the piston 708 drives this piston and, through the action of the conversion system 710, the translational movement of the piston 708 causes the rotation of the winding pulley 702 which winds the winding cable 522 and, in so doing, causes the diverting pulley 520 to rotate and this, in its turn, drives the roller 254 and therefore causes the winding-up of the screen 252.

According to another embodiment, the furling mechanism may comprise a disengageable electric winder on which the winding pulley 702 is fixed and which thus replaces the nitrogen damper 704 and the conversion system 710. The furling mechanism then comprises, for each roller 254, a diverting pulley 520 fixed coaxially to the roller 254, a winding pulley 702, a winding cable 522, of which one end is fixed to the fixed structure 206, and of which the other end is fixed to the winding pulley 702, and in which the winding cable 522 passes over the diverting pulley 520, and a disengageable electric winder, on which the winding pulley 702 is fixed. Disengagement of the electric winder allows the screen 252 to deploy when the deployment mechanism 500 is actuated.

A control unit is connected to the various elements in order to activate them as required. For example, the control unit commands the rotation in one direction or another of each electric winder and of each actuator moving the mobile cowl 216.

Each screen 252 needs to have structural characteristics capable of withstanding the forces generated by the secondary flow 208 and needs to be flexible enough that it can be furled. According to one particular embodiment, each screen 252 is made up of a structure of flexible mesh to which a flexible skin such as a fabric, for example, is fixed.

The invention has been described more particularly in the case of a nacelle beneath a wing but may also be applied to a nacelle situated at the rear of the fuselage.

In order to limit the risk of unintentional deployment of a screen 252, the turbine engine 100 comprises, for each screen 252, a return element 402 which urges the screen 252 into the furled position. The force of the return element 402 for keeping the screen 252 in the furled position is lower than the force developed by the deployment mechanism 500 in the transition from the furled position to the deployed position.

Each return element 402 is, for example, a helical spring, of which one end is fixed at the second edge of the screen 252 concerned and a second end is fixed at an element that is fixed with respect to the roller 254 associated with the screen 252 concerned, such as, for example, to a frame of the cascade of vanes 221. The elongation of the helical spring is sufficient to allow the screen 252 to deploy into the deployed position.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A ducted fan turbine engine having a longitudinal direction and comprising an engine and a nacelle surrounding the engine which comprises a fan casing wherein a duct for a secondary flow is delimited between the nacelle and the engine and wherein an air flow circulates from a front towards a rear of the ducted fan turbine engine, said nacelle comprising:
   a fixed structure fixed to the fan casing,
   a mobile cowl capable of translational movement on the fixed structure in a direction of translation between a forward position, wherein the mobile cowl is positioned in such a way that it is close up to the fan casing, and a backward position, wherein the mobile cowl is positioned in such a way that it is distant from the fan casing in order to define between the mobile cowl and the fan casing an opening between the duct and the outside of the nacelle,
   a set of actuators causing the mobile cowl to move between the forward position and the backward position, and vice versa,
   a plurality of rollers, each mounted having freedom to rotate on the mobile cowl to a rear of the opening when the mobile cowl is in the backward position,
   for each roller of the plurality of rollers, a flexible screen having a first edge fixed to the roller and a second edge opposite to the first edge, wherein said screen can alternately adopt a furled position wherein said screen is wound up around the roller or a deployed position wherein said screen is unwound from the roller and stretched between the roller and the engine across the duct,
   a deployment mechanism arranged to move the second edge of each of the screens so as to move said screen from the furled position to the deployed position, and
   a furling mechanism arranged to drive each roller of the plurality of rollers in rotation so as to move the screen associated with said roller from the deployed position to the furled position.

2. The ducted fan turbine engine according to claim 1, wherein the deployment mechanism comprises:
   for each of the second edges, a plate firmly secured to the second edge,
   for each of the plates, at least one hauling pulley mounted having freedom to rotate on said plate,
   a cable which passes over each of the hauling pulleys, and
   for each end of said cable, a disengageable movement system which hauls on said end.

3. The ducted fan turbine engine according to claim 2, wherein there is a corresponding hauling pulley of the hauling pulleys at each end of said plate.

4. The ducted fan turbine engine according to claim 2, wherein each of the movement systems comprises a set of guide pulleys and an electric roller onto which the cable is wound.

5. The ducted fan turbine engine according to claim 1, wherein the furling mechanism comprises, for each roller of the plurality of rollers, a diverting pulley fixed coaxially to the roller, a winding pulley fixed to the fixed structure, a winding cable of which a first end is fixed to the fixed structure and of which a second end is fixed to the winding pulley and wherein the winding cable passes over the diverting pulley, a nitrogen damper, of which a cylinder is fixed to the fixed structure, and of which a piston is able to slide in the cylinder, and a conversion system which converts the rotational movement of the winding pulley into a translational movement of the piston and vice versa.

6. The ducted fan turbine engine according to claim 1, wherein the furling mechanism comprises, for each roller
- of the plurality of rollers,
    - a diverting pulley fixed coaxially to the roller,
    - a winding pulley,
    - a winding cable, of which a first end is fixed to the fixed structure, and of which a second end is fixed to the winding pulley, and wherein the winding cable passes over the diverting pulley, and
- a disengageable electric winder to which the winding pulley is fixed.

7. The ducted fan turbine engine according to claim 1, wherein, for each of the screens, the ducted fan turbine engine comprises a return element which urges the screen into the furled position.

8. The ducted fan turbine engine according to claim 7, wherein each of the return elements is a helical spring, of which one end is fixed at the second edge of the respective screen, and a second end is fixed at an element that is fixed with respect to the roller associated with the respective screen.

9. An aircraft comprising at least one ducted fan turbine engine according to claim 1.

\* \* \* \* \*